(12) United States Patent
Poulsen et al.

(10) Patent No.: US 10,974,641 B1
(45) Date of Patent: Apr. 13, 2021

(54) TAILLIGHT SYSTEM

(71) Applicants: Greg Poulsen, Eagle Mountain, UT (US); Shaun Poulsen, Eagle Mountain, UT (US)

(72) Inventors: Greg Poulsen, Eagle Mountain, UT (US); Shaun Poulsen, Eagle Mountain, UT (US)

( * ) Notice: Subject to any disclaimer, the term of this patent is extended or adjusted under 35 U.S.C. 154(b) by 0 days.

(21) Appl. No.: 16/720,295

(22) Filed: Dec. 19, 2019

(51) Int. Cl.
*B60Q 1/50* (2006.01)
*B60Q 1/44* (2006.01)

(52) U.S. Cl.
CPC .......... *B60Q 1/441* (2013.01); *B60Q 2400/20* (2013.01); *B60Q 2900/30* (2013.01)

(58) Field of Classification Search
CPC ................................. F21S 43/14; B60Q 1/503
See application file for complete search history.

(56) References Cited

U.S. PATENT DOCUMENTS

| | | | | |
|---|---|---|---|---|
| 4,574,269 A * | 3/1986 | Miller | ..................... | B60Q 1/503 340/468 |
| 4,631,516 A | 12/1986 | Clinker | | |
| 4,928,084 A * | 5/1990 | Reiser | ..................... | B60Q 1/444 340/469 |
| 5,426,414 A * | 6/1995 | Flatin | ..................... | B60Q 1/503 116/28 R |
| 5,652,565 A * | 7/1997 | Salcedas | ................ | B60Q 1/302 340/467 |
| 5,825,281 A * | 10/1998 | McCreary | ............ | B60Q 1/2611 340/425.5 |
| 5,905,434 A * | 5/1999 | Steffan | ..................... | B60Q 1/50 116/28 R |
| 10,309,608 B2 | 6/2019 | Albou et al. | | |
| 2016/0215943 A1* | 7/2016 | Martin | ..................... | F21V 9/08 |
| 2018/0037156 A1* | 2/2018 | Stevens | ................... | F21S 43/26 |
| 2018/0313515 A1* | 11/2018 | Ramos, II | ............ | F21S 43/239 |

* cited by examiner

*Primary Examiner* — Hongmin Fan
(74) *Attorney, Agent, or Firm* — Sanchelima & Associates, P.A.; Christian Sanchelima; Jesus Sanchelima

(57) ABSTRACT

A taillight system including a brake light assembly, a connection assembly, a control assembly and a vehicle assembly. The brake light assembly includes a brake light having a display screen and LEDs. The connection assembly includes a connection plug that permits the brake light to be retrofitted onto existing vehicles. The brake light functions as standard brake lights do. However, the display screen and the LEDs allow for a personalized design selected by a user to be displayed and emitted by the LEDs. The design allows for the user to express their creativity and personality. The user may control the design, color and other features of the design with a remote or with a mobile device. Once the brake light is needed for standard functions of the vehicle the display screen corresponds with emitting those vehicle signals instead of the ornamental design.

20 Claims, 2 Drawing Sheets

TAILLIGHT SYSTEM

BACKGROUND OF THE INVENTION

1. Field of the Invention

The present invention relates to taillight system and, more particularly, to a taillight system that includes designs and images allowing a user to customize a vehicle.

2. Description of the Related Art

Several designs for taillight systems have been designed in the past. None of them, however, include an aftermarket add on taillight or brake light for an ATV, UTV or similar off-road vehicle wherein the brake light has LEDs which can be illuminated in various ornamental designs or patterns and which can be controlled remotely. Thereby allowing a user to customize their vehicle and express their creativity.

Applicant believes that a related reference corresponds to U.S. Pat. No. 4,631,516 for a remote-controlled auxiliary brake light with a changeable display. Applicant believes another related reference corresponds with U.S. Pat. No. 10,309,608 for a tail light with a changing customizable pictogram display. None of these references, however, teach of a brake light that can be illuminated in various ornamental designs allowing a user to express their creativity and personality.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a taillight system that can be retrofitted onto any existing vehicles.

It is another object of this invention to provide a taillight system that can be illuminated in various ornamental designs and patterns.

It is still another object of the present invention to provide a taillight system that allows a user to express their creativity and personality.

It is another object of the present invention to provide a taillight system that can be controlled remotely.

It is another one of the objects of the present invention to provide a taillight system that is easy to operate and control.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
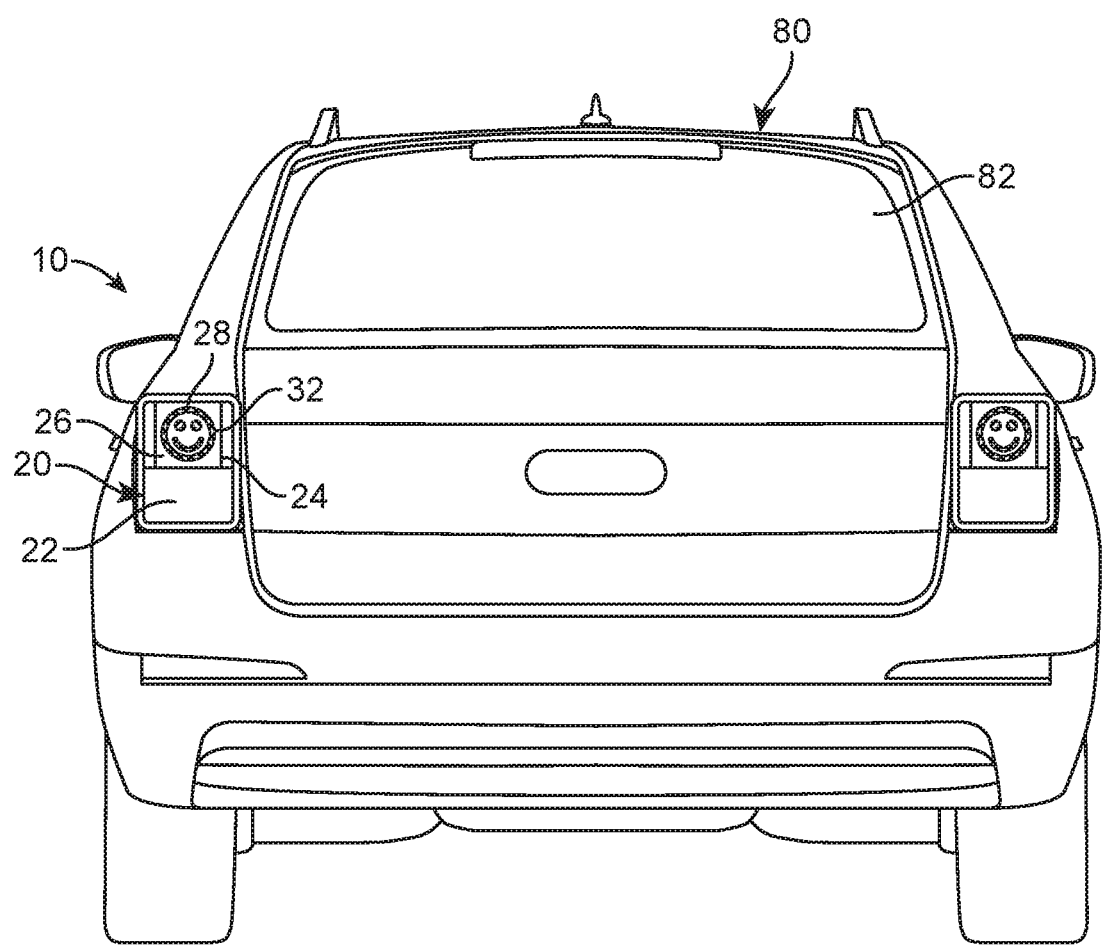
FIG. 1 represents the present invention in an operational setting.

Referring now to the drawings, where the present invention is generally referred to with numeral 10, it can be observed that it, a taillight system 10, basically includes a brake light assembly 20, a connection assembly 40 and a control assembly 60 and vehicle assembly 80.

Referring to FIG. 1, the present invention can be seen in an operational setting. It should be understood that the present invention can be retrofitted onto any vehicles. The vehicles may be cars, ATVs, UTVs, other off-road vehicles or the like. The taillights may be used to display different designs and patterns as users wish. The designs and patterns allow the users to express their creativity and personality. The present invention allows for designs and patterns to be displayed, yet when there is a need to use the tail light for to warn of functions such as braking, turning and the like as needed by vehicles to comply with regulations for being legal.

Figure 2:
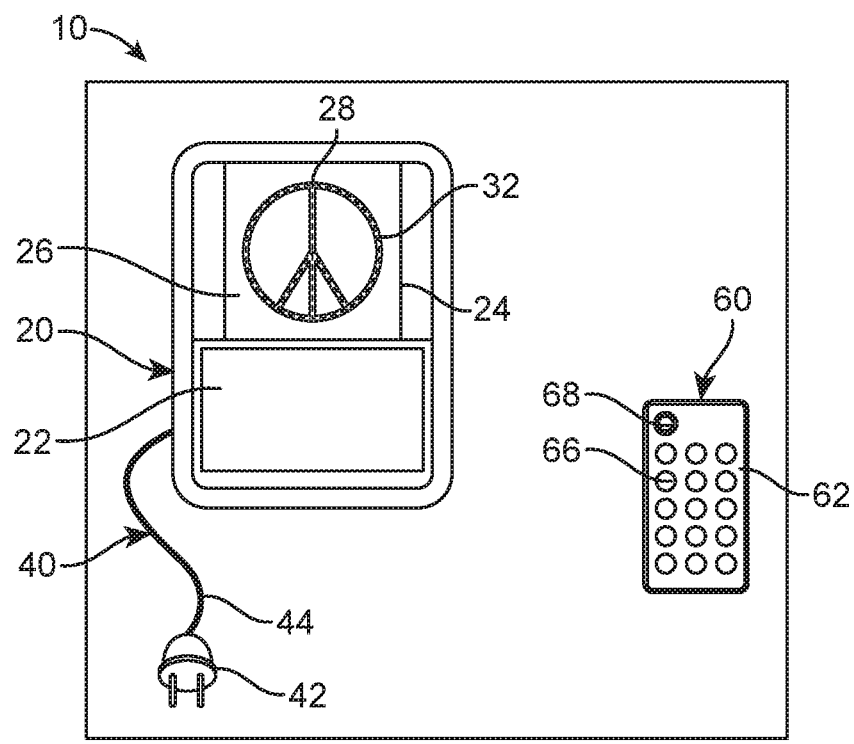
FIG. 2 shows an isometric view of the present invention.
Figure 3:
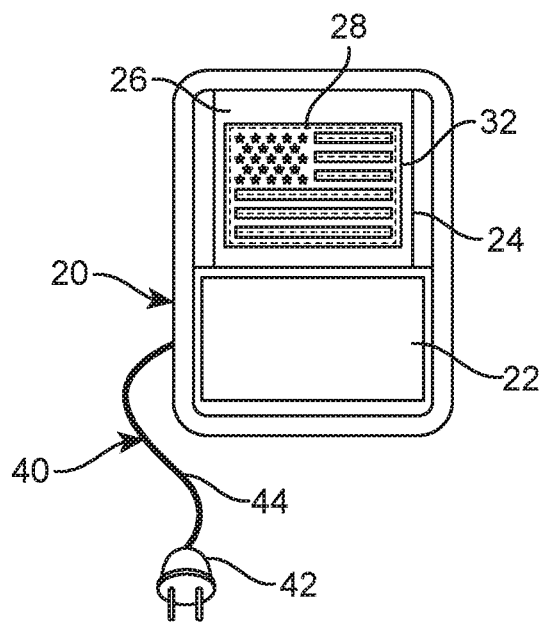
FIG. 3 illustrates a possible design for the present invention to display.

It can be seen best in FIG. 2, that the present invention includes brake light assembly 20. Brake light assembly 20 includes brake light 22. Brake light 22 may replace the current brake lights in vehicles. Thereby allowing for the present invention to be capable of being retrofitted onto any vehicles such as vehicle 82 of vehicle assembly 80. Vehicle 82 may be one of any existing motor vehicles such as off-road vehicles, SUVs, sedans, vans, RVs motorcycles or other similar motor vehicles. Brake light 22 may still function to indicate when the brakes are pressed, when a turn signal is activated, when the emergency blinkers are flashing, when the parked light is activated or other similar functions that may be indicated by taillights. Brake light 22 may include a display box 24 having a display screen 26. Display screen 26 may include LEDs 28 to illuminate a design 32 as selected by a user U. Design 32 may be changed manually or automatically. Design 32 may be shown within display screen 26. Display box 24 may take up a predetermined portion of brake light 22. Display screen 26 may preferably stay within the boundaries of display box 24. It should be understood that brake light 22 and display box 24 may be of a predetermined shape in order to permit for the present invention to be retrofitted onto existing vehicles. User U may select which design 32 from a predetermined amount of designs is to be displayed. In one embodiment, user U may customize and personalize design 32. LEDs 28 illuminate and emit the desired design 32. LEDs 28 permit for additional customization such as colors for design 32 to be illuminated in. LEDs 28 may also allow for design 32 to flash on and off to be more attention grabbing. The present invention may also be configured to rotate through a predetermined amount of design 32, meaning that design 32 being displayed may change automatically after a predetermined amount of time has lapsed. LEDs 28 provide more customization to user U. Display screen 26 may only light up certain LEDs 28 to allow for design 32 to be displayed clearly. It should be understood that the present invention may also include a microprocessor to allow for control of brake light 22 and design 32. LEDs 28 and display screen 26 may also allow for brake light 22 to function as a standard taillight as well. For example, once user U brakes then, design 32 may be automatically turned off and display screen 26 may turn red to match the rest of brake light 22 to indicate that braking of vehicle 82 is taking place.

The present invention may further include connection assembly 40. Connection assembly 40 may permit the present invention to be connected to vehicle 82 for powering thereof. Connection assembly 40 may also allow for communication with functions of vehicle 82 to be communicated to brake light 22 and display screen 26. Connection assembly 40 may include a connection plug 42 that cooperates with standard taillight connections in vehicle 82. Attached to connection plug 42 may be an electrical wire 44. Connection plug 42 and electrical wire 44 allows for brake light to be able to receive power from a battery of vehicle 82. Additionally, connection plug 42 and electrical wire 44 permit the present invention to communicate predetermined situations or events of vehicle 82 in order to allow brake light assembly 20 to react or function accordingly.

The present invention may be operated and controlled by user U with control assembly 60. Control assembly 60 may include a remote 62 that may be operated by user U to control colors, desired designs, flashing settings and all other functions of the present invention. Remote 62 may include a power button 66 and buttons 68 which may be used to select different designs for the present invention. Speed at which design 32 is displayed may also be controlled. Remote 62 may be operated by user while inside or outside of vehicle 82. Additionally, control assembly 60 may include a mobile device 64 having a mobile application thereon. The mobile application may control all settings and functionally brake light 22. This allows for user U to control and configure brake light 22 and design 32 remotely.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A taillight system, comprising:
   a. a vehicle assembly including a vehicle;
   b. a brake light assembly including a brake light and a design, said design being adjacent to and entirely above of said brake light, said design being displayed on a screen, said design selectively illuminated on said screen by LEDs, said screen being entirely above of and in constant abutting contact with said brake light; and
   c. said brake light secured to a rear of said vehicle, said design being turned off when said brake light is actuated to indicate operations of the vehicle.

2. The system of claim 1, wherein said design can be changed manually or automatically.

3. The system of claim 1, wherein said design partially covers said screen.

4. The system of claim 1, wherein said LEDs change colors.

5. The system of claim 1, wherein said design is controlled remotely with a control assembly.

6. The system of claim 5, wherein said control assembly includes a remote having a power button and a plurality of buttons.

7. The system of claim 6, wherein said plurality of buttons correspond with a predetermined of said design that a user selects from to be displayed and illuminated by said LEDs.

8. The system of claim 1, wherein said brake light assembly is retrofitted onto existing vehicles.

9. The system of claim 1, wherein said system includes a connection assembly mounted to said brake light adapted to allow said taillight system to be connected to and powered by said vehicle.

10. The system of claim 9, wherein said connection assembly includes an electrical wire connected to said brake light and a connection plug to connect said taillight system to said vehicle.

11. A taillight system, consisting of:
    a. a vehicle assembly including a vehicle;
    b. a brake light assembly including a brake light and a design, said design selectively illuminated by LEDs, said design being adjacent to and entirely above of said brake light, said brake light assembly further including a display box and a display screen within said display box, said display box being the boundaries for said design to be displayed within, said design displayed and illuminated on said display screen by said LEDs, said LEDs change colors, said display screen being entirely above of said brake light;
    c. a connection assembly including an electrical wire and a connection plug, said electrical wire and said connection plug mounted to said brake light assembly, said connection plug connected to said vehicle to power said brake light assembly with said vehicle;
    d. a control assembly to remotely control said design, said control assembly including a remote having a plurality of buttons, said plurality of buttons correspond with predetermined and various of said design that a user selects from to be displayed and illuminated by said LEDs on said display screen; and
    e. said brake light mounted to a rear of said vehicle at lateral sides of said vehicle, said design being changed by manual or automatic means, said design being turned off when said brake light is actuated to indicate operations of the vehicle, display screen turning red when said brake light is actuated.

12. The system of claim 11, wherein said remote includes a power button to actuate said brake light assembly.

13. The system of claim 11, wherein said control assembly includes a mobile device to control said LEDs and said design.

14. The system of claim 1, wherein said screen in parallel to said brake light.

15. The system of claim 1, wherein said screen turns red when said brake light is actuated and said design is turned off.

16. The system of claim 7, wherein said plurality of buttons are arranged in columns, said columns being parallel to each other.

17. The system of claim 1, wherein said brake light has a length greater than that of said screen.

18. The system of claim 1, wherein various of said design are displayed as said design is automatically changed and displayed on said screen.

19. The system of claim 1, wherein said screen has a height greater than said brake light.

20. The system of claim 1, wherein said design is below a rear windshield of a vehicle.

* * * * *